(12) United States Patent
Steinhauser

(10) Patent No.: US 10,913,400 B2
(45) Date of Patent: Feb. 9, 2021

(54) ERGONOMIC CARGO STORAGE SYSTEM FOR THE CARGO BED OF A VEHICLE

(71) Applicant: Paul M. Steinhauser, Davison, MI (US)

(72) Inventor: Paul M. Steinhauser, Davison, MI (US)

( * ) Notice: Subject to any disclaimer, the term of this patent is extended or adjusted under 35 U.S.C. 154(b) by 0 days.

(21) Appl. No.: 16/257,758

(22) Filed: Jan. 25, 2019

(65) Prior Publication Data
US 2019/0315285 A1    Oct. 17, 2019

Related U.S. Application Data

(60) Provisional application No. 62/622,501, filed on Jan. 26, 2018.

(51) Int. Cl.
*B60R 9/06* (2006.01)
*B60R 11/00* (2006.01)

(52) U.S. Cl.
CPC ............... *B60R 9/06* (2013.01); *B60R 11/00* (2013.01); *B60R 2011/0059* (2013.01); *B60R 2011/0084* (2013.01)

(58) Field of Classification Search
CPC ......... B60R 5/04; B60R 5/041; B60R 13/013; B60R 9/042; B60D 1/003; B62D 33/0273; B62D 43/10
See application file for complete search history.

(56) References Cited

U.S. PATENT DOCUMENTS

| | | | | |
|---|---|---|---|---|
| 2,091,071 A * | 8/1937 | Christian Girl | ........... | B60P 3/07 414/466 |
| 4,305,695 A * | 12/1981 | Zachrich | ................... | B60P 1/00 296/37.1 |
| 5,456,511 A * | 10/1995 | Webber | ..................... | B60P 1/00 296/26.09 |
| 5,816,637 A * | 10/1998 | Adams | ..................... | B60P 3/40 296/26.09 |
| 5,964,492 A * | 10/1999 | Lyon | ........................ | B60R 9/00 224/404 |
| 6,065,792 A * | 5/2000 | Sciullo | .................... | B60P 1/003 296/26.09 |
| 8,840,166 B1* | 9/2014 | Derbes | .................... | B60R 13/01 224/403 |
| 10,137,839 B1* | 11/2018 | Kelley, Jr. | ................. | B60R 7/02 |
| 10,286,853 B1* | 5/2019 | Carbone | ................ | B60R 9/042 |
| 2006/0181101 A1* | 8/2006 | Reynolds | .................. | B60R 7/02 296/37.8 |
| 2008/0136206 A1* | 6/2008 | McKelvey | ............. | B60P 1/003 296/26.09 |
| 2018/0043810 A1* | 2/2018 | Adams | .................... | B60P 1/003 |
| 2018/0281699 A1* | 10/2018 | Furniss | ..................... | B60P 3/14 |

* cited by examiner

*Primary Examiner* — Brian D Nash
(74) *Attorney, Agent, or Firm* — The Weintraub Group, P.L.C.

(57) ABSTRACT

According to this invention, there is provided a cargo storage system for use with a vehicle having a load carrying bed, above the load carrying bed, and a movable including: (a) a grooved bedliner, (b) a cargo tray having opposite lateral sides and opposite longitudinal sides, including a pair of wheels at the forward end and a pair of rollers at the rearward end, the wheels seated in the grooves, rollers riding atop the grooves and support the tray for movement relative to the bedliner and outward extension onto the tail gate, and (c) a tether limiting outward and retraction movement of the tray relative to the bed.

9 Claims, 4 Drawing Sheets

ERGONOMIC CARGO STORAGE SYSTEM FOR THE CARGO BED OF A VEHICLE

CROSS-REFERENCE TO RELATED APPLICATION

This application is a completion application of co-pending U.S. Patent Application, Ser. No. 62/622,501, filed Jan. 26, 2018 for "An Ergonomic Cargo Storage System for the Cargo Bed of a Vehicle," the disclosure of which is hereby incorporated by reference in its entirety including the drawing.

BACKGROUND OF THE INVENTION

1. Field of the Invention

The present invention concerns an easy access slidable and retractable cargo tray assembly for the cargo bed of a vehicle of the type having a tail gate and a pair of opposed upwardly standing sidewalls.

2. Description of the Prior Art

The increased use of light trucks as general purpose vehicles have increased the need for conveniently accessible and secure storage space in the normally open bed of pickup trucks.

Many small businesses have applications in a specific area and demonstrate there is a need which arises in many different situations.

The prior art has described approaches wherein cargo containers are disposed in a pickup truck or like vehicle. Examples of such structures can be found in the following U.S. Pat. No. 5,526,972 (Frazier et al.); U.S. Pat. No. 5,924,616 (Shives); U.S. Pat. No. 5,964,492 (Lyon); U.S. Pat. No. 6,629,714 (Campbell); U.S. Pat. No. 7,044,528 (Rhodes); U.S. Pat. No. 7,090,275 (Pero); U.S. Pat. No. 8,281,967 (Evans); and U.S. Pat. No. 8,925,777 (Casucci et al.); and U. S. Patent Publication No. 2016/0107569 (Thygesen).

The above references may have a disadvantage in that they are complicated, or costly, and limited as to use.

Thus, there is a need for improvements in the availability of conveniently accessible and secure storage space of the normally open bed of a pickup truck and like vehicle.

These above references are identified herein in recognition of a duty of disclosure of related subject matter, which may be relevant under 37 CFR 1.56, and specifically incorporated, herein by reference as regards the conventional approaches and constructions taught therein.

OBJECTS OF THE INVENTION

An object according to this invention is the provision of a storage system which can be movable from a first position contained within a truck bed and a second deployed position wherein the storage system is moved out of the truck bed in position for ready access at a single working location. Such system is easy to operate both to deploy and to retract into the truck bed.

Another object of the present invention is the provision of a cargo tray which is inexpensive and provided with wheels that are inter-fitted compactly into a variety of mounting tracks or grooves of a bedliner and like structures secured to the truck bed. In such approach, the wheels are inter-fitted into respective grooves of the bedliner. The grooves both guide and assure steady longitudinal back and forth movement of the cargo tray.

Another object of the present invention is the provision of a cargo tray that is provided with wheels and rollers at the forward and rearward ends, respectively, of the cargo tray. The rollers cooperate to maintain uniform support of the cargo tray with the bedliner and complement the guided rolling movement of the wheels.

Another object hereof is the provision of mounting means that enable the wheels to be adjusted, as needed, for fitment in a respective groove of the bedliner.

Another object of this invention is the provision of handles and like hand operated devices on the front of a cargo tray to facilitate pulling of the tray in and out of the truck bed.

Another object hereof is the provision a cargo tray that includes a telescoping back bracket that allows for the width to be adjusted in order to appropriately fit within multiple truck beds having varying widths.

It is to the above and other needs of the user to which the invention is directed.

SUMMARY OF THE INVENTION

According to this invention, there is provided a cargo storage system for use with a vehicle having: a load carrying bed, a pair of opposed bed walls that extend above the load carrying bed, and a tailgate that is movable between a closed upright position and an open horizontal position, comprising: (a) a bedliner disposed atop the bed, the bedliner having a plurality of longitudinally extending grooves, (b) a cargo tray having opposite lateral sides and opposite longitudinal sides, said tray having a pair of wheels at the forward end and a pair of rollers disposed at the rearward end, the wheels disposed in respective of the grooves and the rollers adapted to ride atop the grooves and support the tray for movement relative to the bedliner and outward extension onto the tail gate, (c) means for limiting outward and retraction movement of the tray relative to the bed and positioning the outward movement of the tray relative to the tail gate, and (d) means for enabling the user to pull the tray in and out of the bed.

Preferably, the tray comprises a telescoping back bracket that allows the width to be adjusted in order to fit within multiple truck beds having varying widths.

Preferably, the forward end portion of the tray includes a stop that prevents materials stored on the tray from falling out.

In an aspect of this invention, the means for limiting outward and retraction movement of the tray relative to the bed and positioning the outward movement of the tray relative to the tail gate comprises a pair of tethers of fixed lengths, one and the other tether being secured to the back bracket, the attachment or securement may be atop or at the base of the tray.

According to an embodiment of this invention there is provided a cargo storage system for a pickup truck having a cab provided at a forwardmost end, a cargo bed, and a tail gate at the rearward end and movable between open and closed positions, the storage system comprising: (a) a bedliner positionable on the truck bed and having a forward end toward the truck cab and a rearward end toward the tail gate of the truck bed; (b) a cargo tray, (c) means for supporting the cargo tray for rolling movement atop the bedliner and the tail gate when the tray is moved from a forwardmost stowed position in the bed and proximate the cab and movable there over into a rearwardmost access position atop, at least in part, the bedliner and the tail gate of the truck, (d) guide means for guiding the cargo tray for movement on the bedliner, and (e) retainer means for retaining and positioning the cargo tray in the forwardmost and rearwardmost positions.

Preferably, the cargo tray includes a pair of handles for pulling the receptacle to the rearwardmost position and for pushing the receptacle to the forwardmost position. Further, the cargo tray includes a deployable latch handle at the rearwardmost end that enables the user to temporarily store the cargo tray at a location remote to the truck when the tray is not needed or the truck bed is needed for other uses.

The present invention will be more clearly understood with reference to the accompanying drawings and to the following Detailed Description, in which like reference numerals refer to like parts and where:

DETAILED DESCRIPTION OF THE PREFERRED EMBODIMENT

Figure 1:
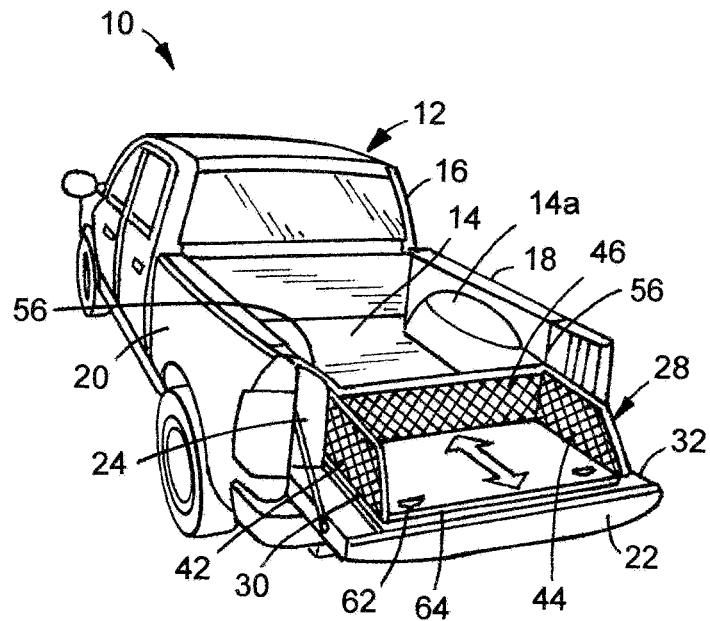
FIG. 1 is a perspective view of the present invention illustrating a cargo tray pulled out from the bed of a pickup truck and positioned atop the tailgate thereof.

Turning now to the drawings, as shown in FIG. 1 there is provided a cargo storage system 10 for use with a vehicle 12 having a load carrying bed 14. The vehicle is shown as a pickup truck with a cab 16 at the forwardmost end, a pair of opposed bed walls 18 and 20 that extend above the load carrying bed, and a tailgate 22 at the rearwardmost end that is movable between a closed upright position and an open horizontal position. As shown, the tailgate is down and in the horizontal open position.

A generally rectangular shaped bedliner 24 is disposed atop the bed 14. The bedliner 24 includes guide means 26 for guiding movement of a cargo tray 28 on the bedliner between the forwardmost and rearwardmost positions. The guide means 26, in a preferred arrangement including the bedliner, has a plurality of laterally spaced grooves 27 that extend longitudinally in undulating fashion between the opposite longitudinal ends of the bedliner. The grooves 27 form successive peaks 27a and valleys 27b.

The cargo tray 28 is slidably disposed atop the bedliner 24 for rolling movement thereover. The cargo tray is adapted to store objects therein and has opposite lateral sides 30 and 32 disposed adjacent the side bed walls 20 and 18 of the truck and opposite longitudinal sides 34 and 36, top and bottom surfaces 38 and 40, respectively. The tray also includes a pair of sidewalls 42 and 44 that extend upwardly from the opposite lateral sides 30 and 32, and a back bracket 46. The cargo tray is comprised of conventional durable materials.

The cargo tray 28 has a pair of wheels 48 and 50 disposed in respective wheel assemblies 51 at the rearward end 34 and a pair of rollers 52 and 54 disposed proximate the forward end 36. The wheels 48 and 50 cooperate with the guide means 26 and are nested in respective of the grooves 26 and roll within the receiving groove. The wheels never leave their respective grooves. While two wheels and two rollers are shown, more could be added depending on the weights to be stored in the tray or an increased need to support the bottom of the tray in spaced relation above the bedliner.

Figure 6:
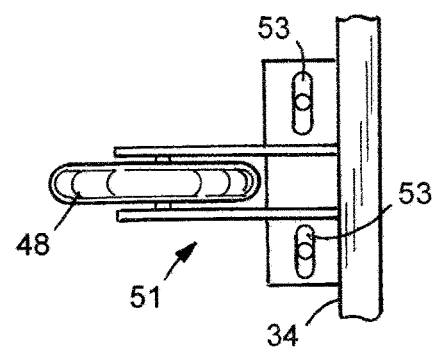
FIG. 6 shows adjustability of a wheel assembly relative to the cargo tray.

The wheel assemblies 51, as shown in FIG. 6, are attached to the cargo tray and include transverse slots 53 that enable the wheel assembly to be moved, laterally, relative to the end of the cargo tray, such as to better position the fitment of a wheel 48 or 50 in its respective groove, or mount the wheel into a different groove 26, or add and position another wheel assembly and associated wheel to the cargo tray and associated groove. A weld or abutment is projected in the slots 53 to constrain the lateral movement of the wheel assembly relative to the cargo tray.

The rollers 52 and 54 are adapted to ride atop the peaks 26a of the grooves 26 and support the cargo tray 28 for longitudinal movement relative to the bedliner 24. The rollers are laterally spaced on the bottom surface 40 of the cargo tray.

The cargo tray 28 moves from a retracted stowed position completely atop the bedliner 24 in the bed 14 adjacent to the truck cab 16 and, therefrom, into the rearwardmost access position, at least in part. In this configuration is shown a supported tray on the bedliner by the wheels 48 and 50 and outwardly of the bed and supported on the tail gate 22 by the rollers 52 and 54.

Figure 2:
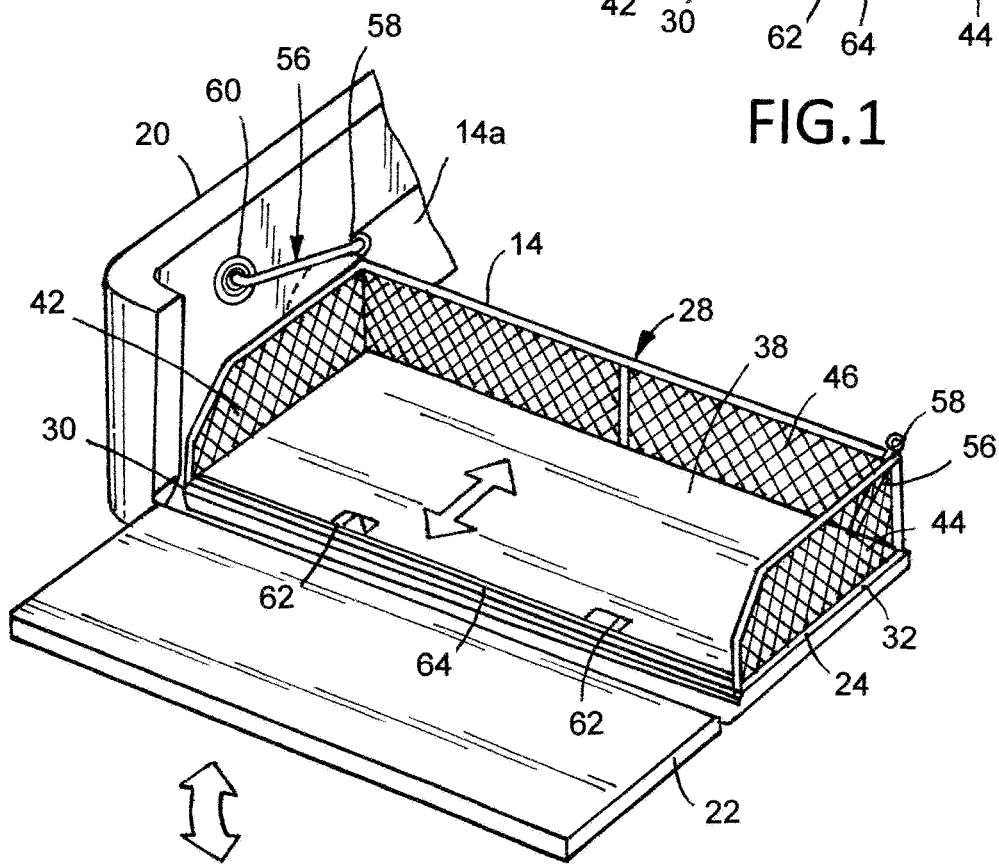
FIG. 2 is a perspective view of the cargo tray retracted into the cargo bed of the truck and juxtaposed between the sidewalls and rear wheels.
Figure 3:
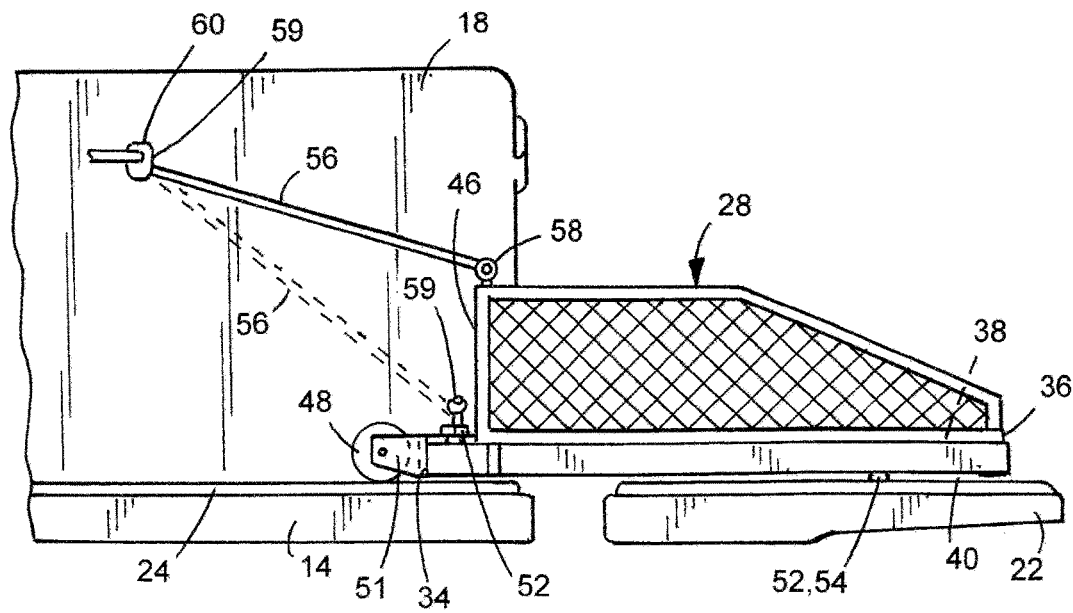
FIG. 3 is a side elevation view of the cargo tray pulled outwardly of the truck bed and illustrating rearward wheels that support the rearward end of the tray on a bedliner of the truck and forward rollers that support the forward end of the tray on the tailgate.
Figure 4:
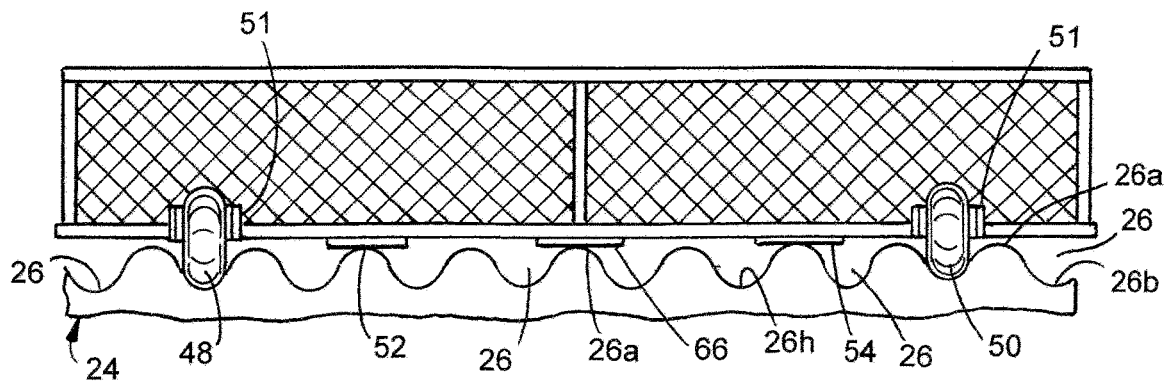
FIG. 4 is an end elevation view of the cargo tray disposed atop the bedliner with the rearward wheels disposed in respective grooves of the bedliner and the forward rollers of the tray supported on the bedliner.

In FIGS. 1 and 3, the cargo tray 28 is outward of the bed 14 and positioned on the tail gate 22, at least in part. In FIG. 2, the cargo tray 28 is retracted and positioned or stowed entirely in the truck bed 14, proximate to the vehicle wheel shape 14a.

Limiting means 56 for limiting outward and retraction movement of the tray relative to the bed and positioning the outward movement of the tray relative to the tail gate are provided, such as shown by tethers 56. As shown in FIGS. 2 and 3, the opposite ends of each respective tether 56 connects to an anchor or tie down ring 58 at one top lateral edge of the back bracket 46 and to a tie down ring 60 on a respective bed wall 18 and 20. Preferably, the length of the tether is adjustable to enable use in truck beds of different dimensions.

In some applications, as shown in dotted lines in FIG. 3, the opposite ends of the tethers may connect to a tie down ring 59 at the base of the back wall and to a respective pin 60 on the bed wall of the truck.

Importantly, the tethers 56 and connecting tie down rings are positioned such that the tethers 56 on opposite lateral sides of the cargo tray 28 both position the retracted position as well as the extended position of the cargo tray relative to the bedliner and truck bed as well as the tail gate.

Preferably, a snap or quick disconnect 59 is provided to the ends of the tethers 56 to quickly connect to and release the tethers to the tie down rings 58 on the truck sidewalls.

As shown in FIGS. 1 and 2, means 62 for enabling the user to pull the tray in and out of the bed are provided, such as hand grips 62 are positioned for access and use on the top surface 38 and rearwardmost end of the cargo tray.

Preferably, the cargo tray is constructed in a manner that the back bracket 46 is adapted to telescope laterally outwardly and inwardly, relative to the side walls of the truck bed, so as to allow the width of the back bracket to be adjusted in order to fit within multiple truck beds having varying widths.

Preferably, the rearwardmost end portion of the top surface 38 of the cargo tray includes a stop 64 that prevents materials stored on the cargo tray from falling out. In the embodiment shown, the stop 64 is an elongated rod that is secured to the rearwardmost outwardly movable end of the cargo tray.

Figure 5:
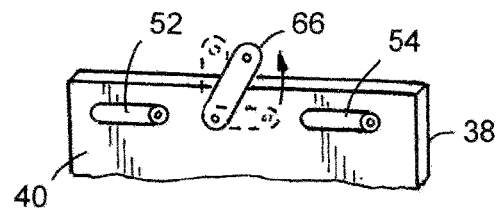
FIG. 5 shows the bottom forward end of the cargo tray and two laterally spaced the rollers that support the tray atop the bedliner and a deployable latch handle that allows the tray to be hung when not in use.

Further, the cargo tray includes a deployable latch handle 66 at the rearwardmost end that enables the cargo tray to be temporally stored at a location remote to the truck. As shown best FIG. 5, the latch handle is disposed on the bottom surface 40 of the cargo tray and is pinned for rotation thereto between a position juxtaposed against the bottom surface and a second position at right angles thereto, the free end being adapted to secure to a pin remote to the truck and be hung for storage.

Figure 7:
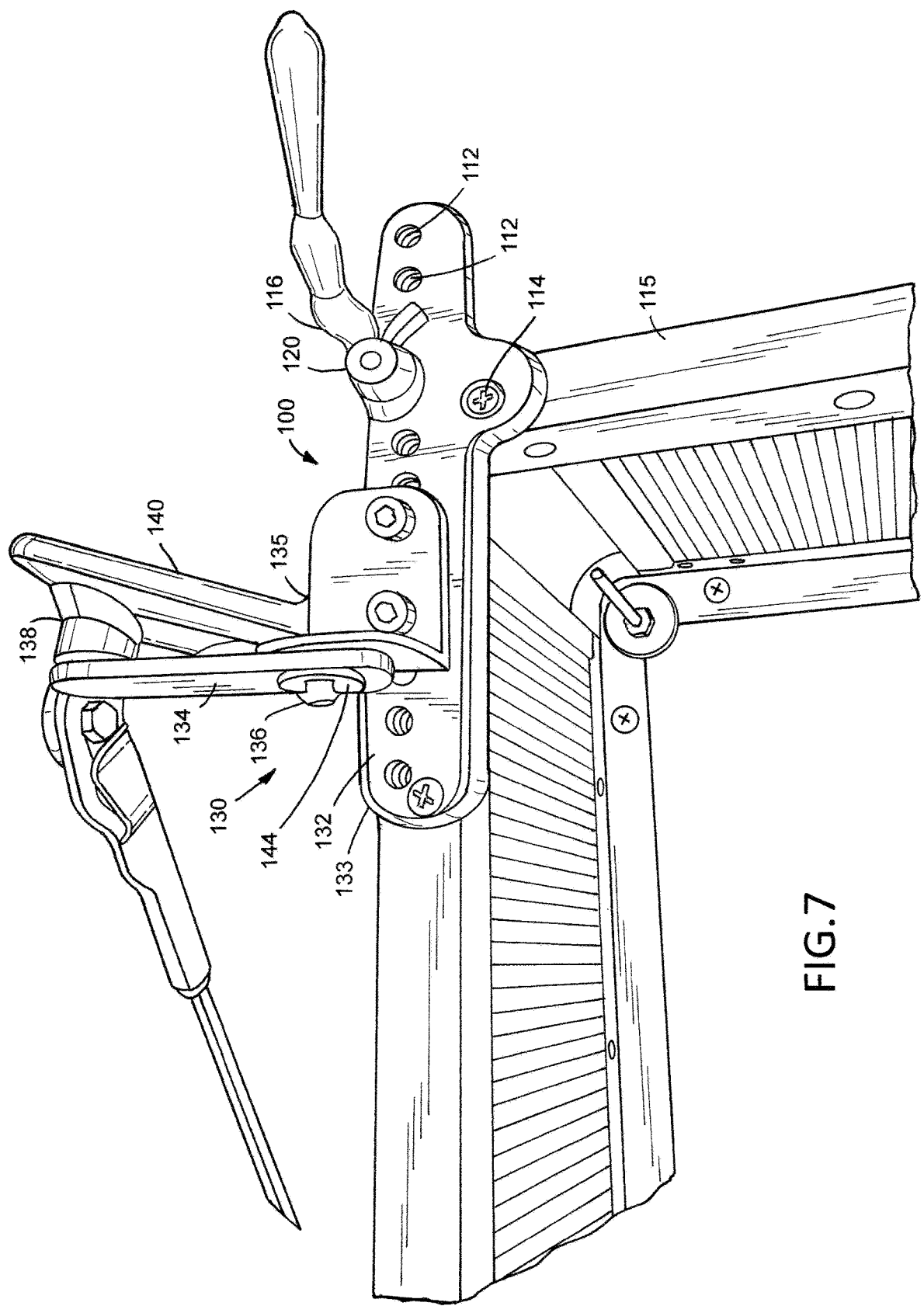
FIG. 7 is a plan view showing an adjustment bracket and brake assembly for use herein.
Figure 8:
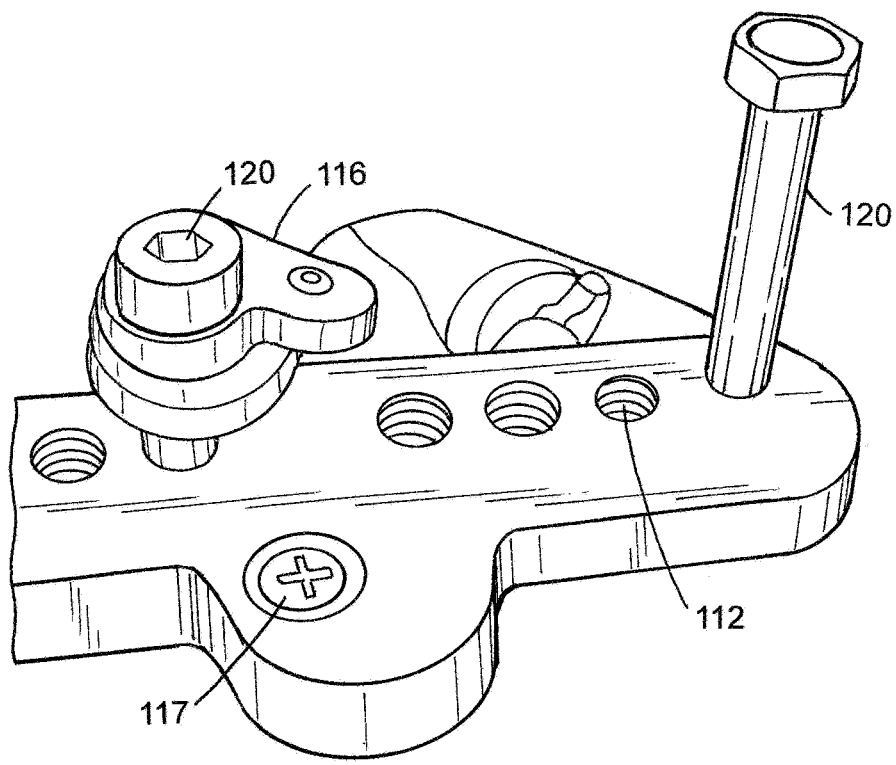
FIG. 8 is a broken plan view showing the fastening of the tether to the adjustment bracket.

Now, and with reference to FIGS. 7 and 8 there is shown therein an adjustment bracket and brake assembly to enable the instant carrier to be adapted to various types of beds.

As shown, the adjustment bracket 100 comprises an elongated plate 110 having a plurality of apertures 112 disposed along the extent thereof. Depending on the model of the carrier, the adjustment bracket enables the tether 116 to be properly fitted along the extent of the adjustment bracket.

The tether 116 is secured to the adjustment bracket and is secured thereto at the appropriate location via a fastener 120 in a manner previously described hereinabove.

Each of the apertures 112 are threaded to receive the complementary threaded fastener(s) 120 (not shown) to secure the tether 116 to the upper rail 115 of the carrier, itself.

The adjustment bracket is fixed through a threaded fastener such as that shown at 117. The fastener 117 threadably secures the adjustment bracket to the carrier along the top rail 115.

The brake or braking system 130 limits the retraction of the cargo carrier when it is retracted. Thus, the combination of the tether 116 being of the proper length and the brake 130 ensure the stability of the carrier. The brake acts as a positive stop during the retraction of the carrier.

The braking system 130 is fixed to the top rail 115 and includes a substantially L-shaped plate 132, having a first leg 133, which is fixed to the top rail 115 of the carrier or tray in a manner similar to that with respect to the tether. An upstanding second leg 135 is integral with the first leg 133.

A rotatable elongated bar 134 is secured to the upright plate 135 via threaded fasteners 136, as shown.

A bumper 138 secured to the free end of the bar 134 engages the vehicle at a reset surface 140.

The bar 134 is rotatably pivotably mounted to the leg 135.

The fastener 136, such as a bolt, projects through a suitable opening (not shown) formed in the upstanding leg 135 of the bracket to fasten the bar thereto.

A washer or disc 144 abuts against the bar 134. This enables the bar 134 to be rotated into the carrier volume to enable the carrier to be extended without interference.

Having, thus, described the invention, what is claimed is:

REFERENCE NUMBERS IN DRAWINGS 10 cargo storage system
12 vehicle (pickup truck)
14 load carrying bed
14a wheel shape
16 cab
18,20 bed walls
22 tail gate
24 bedliner
26 guide means (longitudinal grooves
26a,26b peaks, valleys
28 cargo tray
30,32 lateral sides/28
34,36 longitudinal sides/28
38,40 top and bottom surfaces/28
42,44 sidewalls/28
46 back bracket
48,50 wheels
51 wheel assembly/48,50
53 slot/51
52,54 rollers
56 limiting means (tethers)
57 snap or quick disconnect/end of 56 to 58/60
58,60 anchor or tie down ring/for 56
59 pin/56
62 means/hand grips
64 stop
66 latch handle
100 adjustment bracket
112 apertures
115 top rail
116 tether
117 fastener
120 fastener
130 braking system
132 plate
133 first leg
134 elongated bar
135 second leg
136 fastener
137 fastener
138 bumper
140 reset surface
144 disc

The invention claimed is:

1. A cargo storage system for a vehicle having a cargo bed, and a tail gate at the rearward end and movable between open and closed positions, the storage system comprising: (a) a bedliner positionable on the cargo bed and having a forward end toward the cargo cab and a rearward end toward the tail gate of the cargo bed; (b) a cargo tray, including a pair of handles for pulling the tray to the rearwardmost position and for pushing the tray to the forwardmost position; (c) means for supporting the cargo tray for rolling movement atop the bedliner and the tail gate when the tray is moved from a forwardmost stowed position in the bed and movable there over into a rearwardmost access position atop, at least in part, the bedliner and the tail gate of the vehicle; (d) guide means for guiding the cargo tray for movement on the bedliner; and (e) retainer means for retaining and positioning the cargo tray in the forwardmost and rearwardmost positions, and (f) a deployable latch handle at the rearwardmost end of the tray, the handle enabling the user to temporarily store the cargo tray at a location remote to the vehicle, and wherein, the storage system seats atop the vehicle floor without the need for reconstruction thereof.

2. The system of claim 1, wherein the bedliner has a plurality of laterally spaced grooves that extend longitudinally in undulating fashion between the opposite longitudinal ends of the bedliner, the grooves forming successive peaks and valleys.

3. The system of claim 1, wherein the cargo tray has a pair of wheels disposed in respective wheel assemblies at the rearward end and a pair of rollers disposed proximate the forward end, the wheels cooperating with and nesting in respective grooves and roll within the receiving groove.

4. The system of claim 1, wherein the wheel assemblies are attached to the cargo tray and include transverse slots that enable the wheel assembly to be moved laterally, relative to the end of the cargo tray.

5. The system of claim 1, which further comprises limiting means for limiting outward and retraction movement of the tray relative to the bed and positioning the outward movement of the tray relative to the tail gate.

6. The system of claim 5, wherein the means for limiting comprises a pair of tethers, the length of each tether being adjustable in length, the tethers disposed on opposite lateral sides of the cargo tray in both the retracted position as well as the extended position of the cargo tray relative to the bedliner and vehicle bed and the tail gate.

7. The system of claim 1, wherein the cargo tray includes a deployable latch handle at the rearwardmost end that enables the cargo tray to be temporally stored at a location remote to the vehicle.

8. The system of claim 1, which further comprises:
(a) an adjustment bracket secured to a top rail of the tray, the bracket having a plurality of apertures along the extent thereof, at least one tether secured to the adjustment bracket in a pre-selected aperture; and
(b) a fastener for securing the tether on the pre-selected aperture.

9. The system of claim 8, which further comprises:
a rotatable locking bar, the locking bar being secured to the adjustment bracket, the locking bar including a bumper engageable with a side of the vehicle to limit the extension of the tray.

* * * * *